United States Patent [19]

Byleveld

[11] 4,371,506

[45] Feb. 1, 1983

[54] AMMONIACAL ELUTION OF COPPER FROM ION EXCHANGE RESINS

[75] Inventor: Eduard Byleveld, Richmond Hill, Canada

[73] Assignee: Himsley Engineering Limited, Toronto, Canada

[21] Appl. No.: 274,865

[22] Filed: Jun. 18, 1981

[51] Int. Cl.$^3$ .............................................. C01G 3/14
[52] U.S. Cl. .................................................... 423/24
[58] Field of Search .................... 423/74, DIG. 16; 75/101 BE

[56] References Cited

U.S. PATENT DOCUMENTS

| | | | |
|---|---|---|---|
| 2,980,607 | 4/1961 | Mock | 75/101 BE |
| 2,993,782 | 7/1961 | Hampton | 423/24 |
| 3,003,866 | 10/1961 | Mattano | 423/24 |
| 3,998,627 | 12/1976 | Weir | 423/24 |
| 4,098,867 | 7/1978 | Grinstead | 423/24 |

OTHER PUBLICATIONS

Yannopoulous et al. (Editors), *Extractive Metallurgy of Copper*, vol. II, (1976) Aime, N.Y. pp. 1009–1024.

*Primary Examiner*—Brian E. Hearn
*Attorney, Agent, or Firm*—Ridout & Maybee

[57] ABSTRACT

Elution of copper from chelating anion exchange resins wherein the first volumes of eluate obtained have very low copper contents. The elution is conducted in an elution cycle which is applied to successive loaded batches of resin. In each cycle the loaded resin is pretreated with a low grade copper tertiary solution obtained as a process effluent from a preceding cycle. Copper from a tertiary solution becomes loaded onto the resin. The resin is then contacted with a secondary eluant, also obtained as an effluent from a preceding cycle. The first fraction of effluent is stored for use as the tertiary solution in the next cycle and the second fraction is recovered as concentrated eluate. The resin is then contacted with a primary eluant. The first fraction of effluent is recovered as concentrated eluate and the second fraction is stored for use as secondary eluant in the next cycle.

24 Claims, 6 Drawing Figures

AMMONIACAL ELUTION OF COPPER FROM ION EXCHANGE RESINS

The present invention relates to the elution of copper (cupric) ion from chelating anion exchange resins, using aqueous ammonia solution as the eluant.

It is known to elute metal ions from beds of ion exchange resins by subjecting the beds successively to a so-called split elution cycle wherein a primary eluant solution is contacted with the bed and an effluent solution is withdrawn from the bed in two fractions, the first of which is a concentrated eluate containing the metal ion of interest and the second of which has a lower concentration of the ion of interest. The first fraction, or concentrated eluate, is recovered, and the second fraction is stored and utilized as a secondary eluant solution during the elution of the next succeeding bed to be eluted, this secondary eluant being contacted with the next loaded bed to be eluted prior to contacting the bed with the primary eluant. This method, which is described for example in R. C. Merritt, "The Extractive Metallurgy of Uranium" United States Atomic Energy Commission, 1971, pages 171 to 173, can effectively reduce the volume of eluate produced and at the same time increase the concentration of metal ion in the eluate.

It has now been found that when it is attempted to apply such spit elution cycle to elution of copper from certain resins, particularly chelating anion exchange resins, using aqueous ammonia solution as the eluant, there is the disadvantage that the first fraction of eluate contains very low concentrations of copper ion and an eluate of low concentration is obtained.

It has further been found that if the first fraction of the effluent solution obtained from elution with the secondary eluant is collected and contacted with the loaded bed as a pre-treatment for the next succeeding bed of resin that is to be eluted, this effluent, which may be termed a tertiary solution, has the property of loading its dissolved copper on the loaded resin so that the loading of copper is in excess of the copper already absorbed by the resin during its loading step. On elution of the resin, this additional copper is eluted along with the previously loaded copper to yield an eluate having a concentration considerably higher than can be obtained with the known split cycle elution.

According, the invention provides a method for the successive elution of cupric ion-loaded beds of chelating anion exchange resin, to recover an eluate of relatively high copper concentration, comprising subjecting each bed to an elution cycle comprising (a) contacting the bed with a tertiary ammoniacal solution of relatively lo copper concentration obtained as effluent solution from step (f) of the preceding elution cycle;

(b) withdrawing a first effluent solution from the bed;

(c) removing said first effluent solution from the system;

(d) contacting the bed with a secondary ammoniacal eluant solution of intermediate copper concentration obtained as effluent from step (k) of the preceding elution cycle;

(e) withdrawing from the bed first and second fractions of a second effluent solution, said fractions having relatively low and relatively high copper concentrations respectively;

(f) collecting the first fraction of said effluent solution for use as tertiary solution in step (a) of the next elution cycle;

(g) recovering said second fraction;

(h) contacting the bed with a primary ammoniacal eluant solution substantially free of copper ions;

(i) withdrawing from the bed first and second fractions of effluent solution having relatively high and intermediate copper concentrations, respectively;

(j) recovering said first fraction;

(k) collecting said second fraction for use as secondary eluant in step (d) of the next elution cycle;

(l) providing a bed of cupric ion-loaded chelating anion exchange resin; and (m) re-commencing said elution cycle by repeating steps (a) to (l).

Particularly preferred for use as the chelating anion exchange resin for the purposes of the present invention are certain chelating ion exchange resins available from Dow Chemical Ltd. under the designations DOWEX (trade mark) XFS 4195, XFS 4196 and XFS 4066, as these resins have particularly desirable copper absorption properties and may be employed to absorb copper from aqueous solutions to achieve high loadings of copper ion. The above-mentioned DOWEX resins belong to the class of chelating anion exchange resins that accept cupric ions from acidic solutions i.e. aqueous solutions having a pH lower than 7. These resins are described in U.S. Pat. No. 4,098,867 in the name Robert R. Grinstead et al, dated July 4, 1978. As described in the patent, these resins are characterised by the presence of pendent aminopyridine groups, more preferably 2-picolylamine groups. Although these resins are capable of accepting high loadings of copper ion, they exhibit to a marked degree the property that on elution with ammoniacal aqueous solutions, the first volumes of eluate obtained contain extremely low concentrations of copper. These resins are therefore particularly well adapted for elution by the process of the invention. As may be appreciated, however, the above process can also readily be applied to resins that possess similar elution profiles, wherein a low grade effluent is obtained during the initial stage of elution.

BRIEF DESCRIPTION OF THE DRAWINGS

The invention will now be more particularly described by way of example only with reference to the accompanying drawings wherein.

Figure 1:
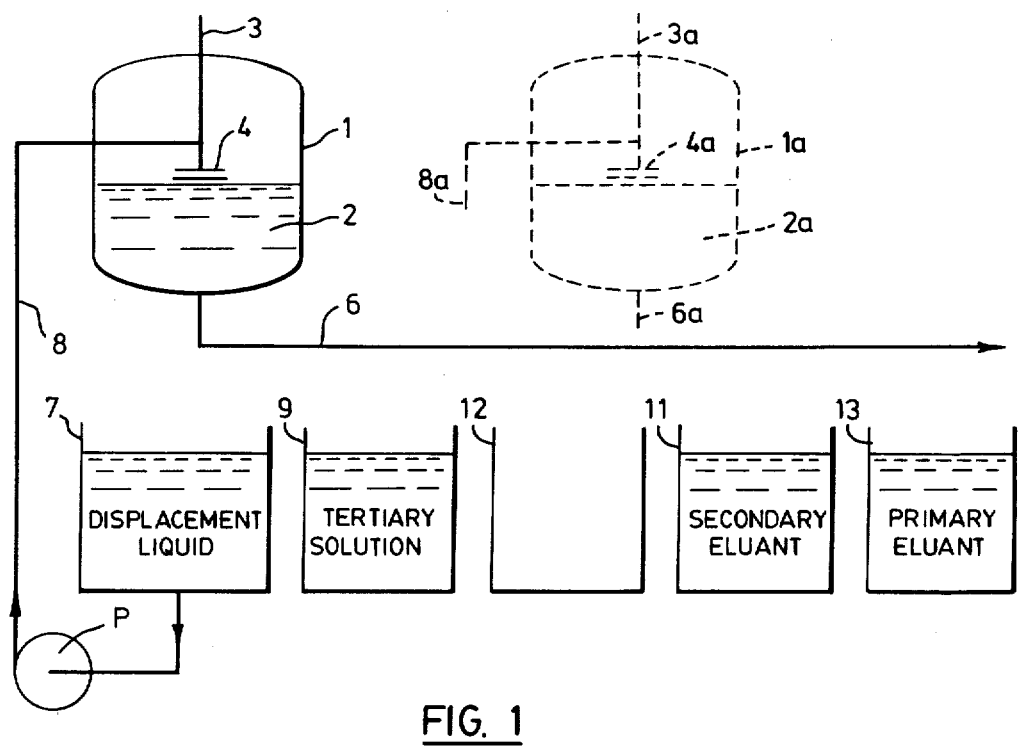
FIGS. 1 to 6 show schematically the various sequential stages of an elution cycle.

The elution cycle described herein is usually operated in conjunction with a complimentary absorption cycle, wherein a bed of resin is loaded with copper ions each time prior to the bed being subjected to the elution cycle. The stripped bed obtained after elution is then returned to its function of absorption and the cycles of elution-absorption can then be repeated.

Referring to the drawings, an elution vessel 1 contains a bed of chelating anion exchange resin 2 loaded with copper ions. The bed 1, in one example, may be loaded by flowing therethrough an aqueous cupric solution, introduced into the vessel through a pregnant liquor inlet conduit 3, connected to a distributor 4 within the vessel 1.

Once the resin has achieved a predetermined loading of copper, which may for example be determined by breakthrough of copper detected in an outlet conduit 6 connected to the bottom of the vessel 1, flow through the inlet conduit 3 is stopped and as shown in FIG. 1, a portion of the pregnant liquor is displaced from at least the upper portion of the resin bed 2 with a displacement liquid withdrawn from a reservoir 7 thereof, which is kept replenished with the displacement liquid, and pumped to the vessel 1 through a pump P and an eluant inlet line 8 to the distributor 4.

As will be appreciated in the drawings, each Figure depicts the portions of the elution apparatus actually in use in the relevant elution stage. Other portions such as auxiliary conduits, valves, etc., that may be required in the performance of the complete elution cycle will be readily realized by and apparent to one skilled in the art from consideration of the other Figures of the drawings.

The displacement liquid introduced in FIG. 1 serves as a barrier solution and is selected to be inert with respect to the pregnant copper solution introduced through the inlet conduit 3 and the solution subsequently introduced into the elution vessel during the next stage of the elution cycle. For example, where the pregnant solution is a copper sulfate solution and the subsequent elution cycle liquid is an ammoniacal solution, the displacement liquid may be water or an aqueous solution of ammonium sulfate. It will be appreciated therefore that the displacement stage shown in FIG. 1 is optional and is required only where undesired chemical reaction, such as precipitation, may occur on mixing of the pregnant solution with the liquid introduced in the subsequent elution stage. In the above example, the displacement liquid avoids precipitation of copper hydroxide due to reaction of the copper sulfate with the alkaline liquid used in the next stage.

The quantity of displacement liquid should not be more than that required to avoid undue mixing of the relevant process liquids, and typically about 0.1 to about 0.5 bed volumes of the displacement liquid are introduced (wherein "bed volume" refers, as is conventional, to the volume of wet settled resin 2), more preferably about 0.3 bed volumes. In each stage of the elution cycle herein described, the volume of liquid in the vessel 1 is maintained constant by conventional means, and thus each time a process liquid is introduced into the vessel 1, there is a concomitant discharge of a similar volume of liquid from the bottom of the vessel 1 through conduit 6. In the stage shown in FIG. 1, the pregnant feed solution displaced is passed through conduit 6 to waste or to a feed tank (not shown) from which the pregnant copper solution is withdrawn during the absorption cycle.

Figure 2:
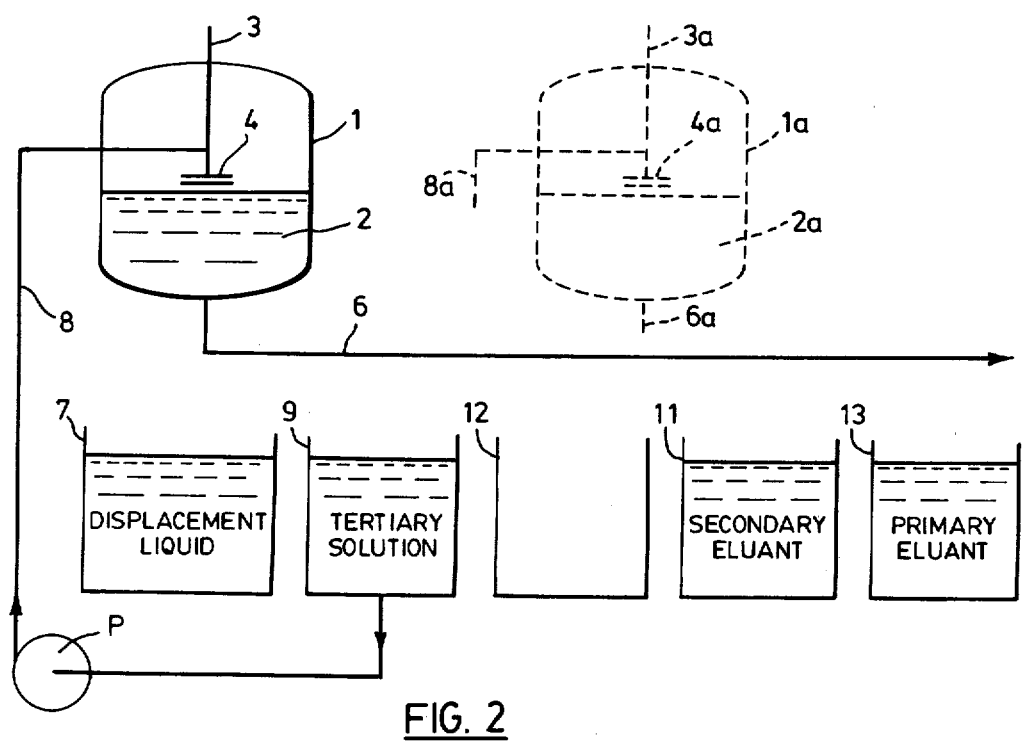

Withdrawal from the reservoir 7 is then stopped and, as shown in FIG. 2 a tertiary solution from a tank 9 is passed by the pump P to the resin 2. This solution is an ammoniacal solution containing a relatively low copper concentration, and is obtained as an effluent from the vessel during the third stage of the elution cycle, as described in more detail hereinafter with reference to FIG. 3. On start-up, tank 9 may be filled with a dilute ammoniacal copper solution, or stage two may be omitted until completion of an elution cycle including stage three, following which the solution is self-generated by the process. In the preferred form of the process there is no build-up of process liquid in tank 9, as the entire volume of tertiary solution collected in tank 9 in the third stage of each elution cycle is passed to the bed 2 in the second stage of the succeeding elution cycle. Typically, the volume of tertiary solution employed is about 0.1 to 1.0 bed volumes. It has been found that, at the low copper concentrations that are achieved in the tertiary solution collected in the third stage, the copper content of this solution is absorbed by the previously loaded resin, thus increasing its loading of copper above that collected on it during the absorption cycle. More preferably the volume of the tertiary solution collected and employed in each elution cycle is about 0.4 bed volumes. The relatively barren liquid displaced as effluent through the outlet conduit 6 is passed to waste or to the feed tank containing the pregnant copper solution, depending on the copper content of the liquid.

Figure 3:
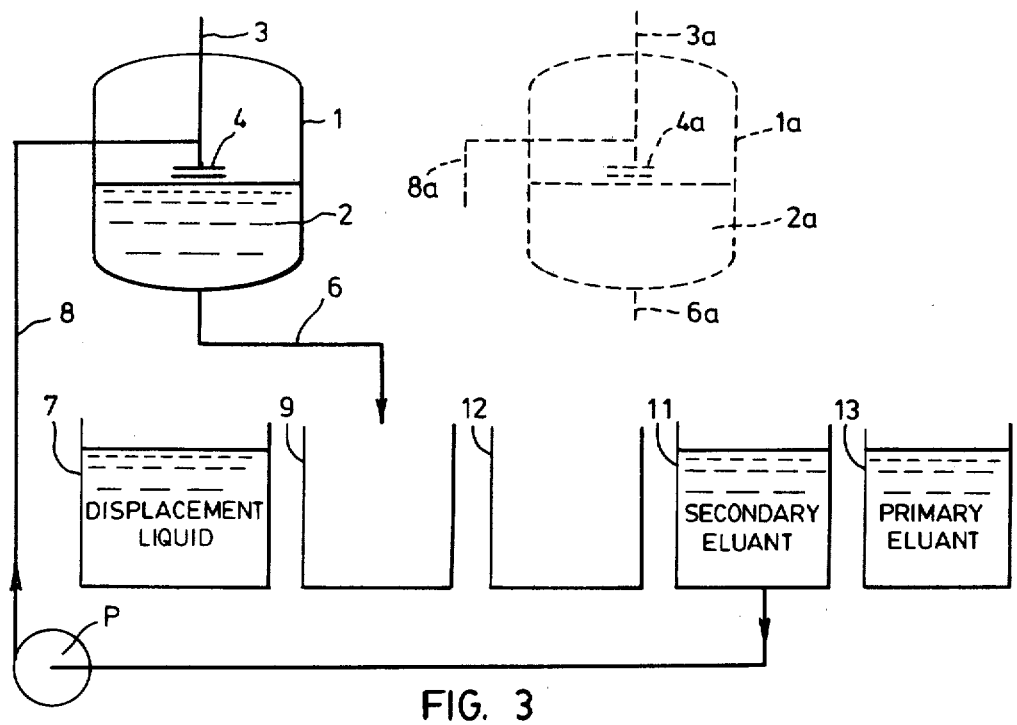
Figure 4:
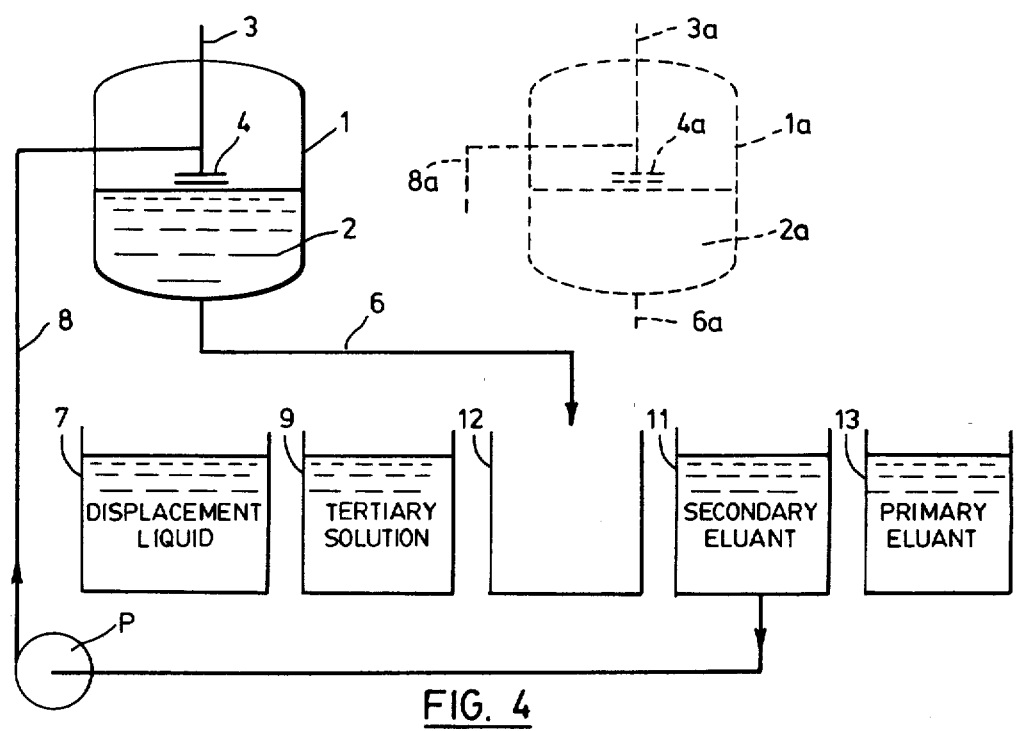

In the third and fourth stages, as shown in FIGS. 3 and 4, secondary eluant solution is withdrawn from a tank 11 and is passed to the vessel 1. The secondary eluant solution is an ammoniacal solution containing an intermediate concentration of copper ions and is itself obtained as an effluent from the vessel 1 during the sixth stage of the elution cycle as described hereinafter in more detail with reference to FIG. 6. On start up, tank 11 may contain a prepared solution of copper sulfate and ammonia, or stage three may be omitted until the next elution cycle, by which time the secondary eluant has been obtained as a process liquid in step 6. In subsequent elution cycles, the process then self-generates the secondary eluant. In the preferred form of the process, there is no build-up of liquid in the tank 11, as the entire volume of secondary eluant solution collected in the tank 11 in stage six in each elution cycle is passed to the vessel 1 during the third and fourth stages of the succeeding elution cycle. In stage three, as shown in FIG. 3, the first fraction of the effluent displaced from the bed 1 is passed through the conduit 6 to the tertiary solution storage tank 9. Initially, very little copper is displaced from the resin but with continued flow of eluant through the bed the concentration of copper in the effluent rises to a maximum and then begins to gradually decrease as the resin becomes depleted. It is therefore desirable to collect as the first fraction a volume which is not too small as this tends to result in an excessively large quantity of the low grade effluent being passed to the concentrated eluate in stage four of the cycle, with the result that the concentrated eluate is undesirably diluted, while if too large a quantity is collected in the tank 9, this results in an inefficient recycling of copper and a reduction in the quantity of concentrated eluate collected during the fourth and fifth stages of the elution cycle. The appropriate quantity of the tertiary solution to be collected can readily be determined in each case by one skilled in the art by trial and experiment. As noted above, the volume of the first fraction collected in tank 9 will typically be in the range 0.1 to 1.0 bed volumes. In the preferred form, employing the most preferred ion exchange resins, the quantity collected is about 0.4 bed volumes.

In the fourth stage, as shown in FIG. 4, the effluent is passed through the conduit 6 to a collection tank 12 for containing the concentrated eluate. During this stage the concentration of copper in the effluent rises toward the maximum for the elution cycle, and preferably the quantity of secondary eluant made available in stage six, as hereinafter described, is such that at termination of stage four the concentration of copper in the effluent is adjacent the process maximum. Typically, in stages three and four a total quantity of about 0.4 to about 1.5 bed volumes of secondary eluant are passed to the resin 2, more preferably about 0.8 bed volumes, and of this the second fraction, or concentrated eluate, typically constitutes about 0.1 to 1.0 bed volumes, more preferably about 0.4 bed volumes.

Figure 5:
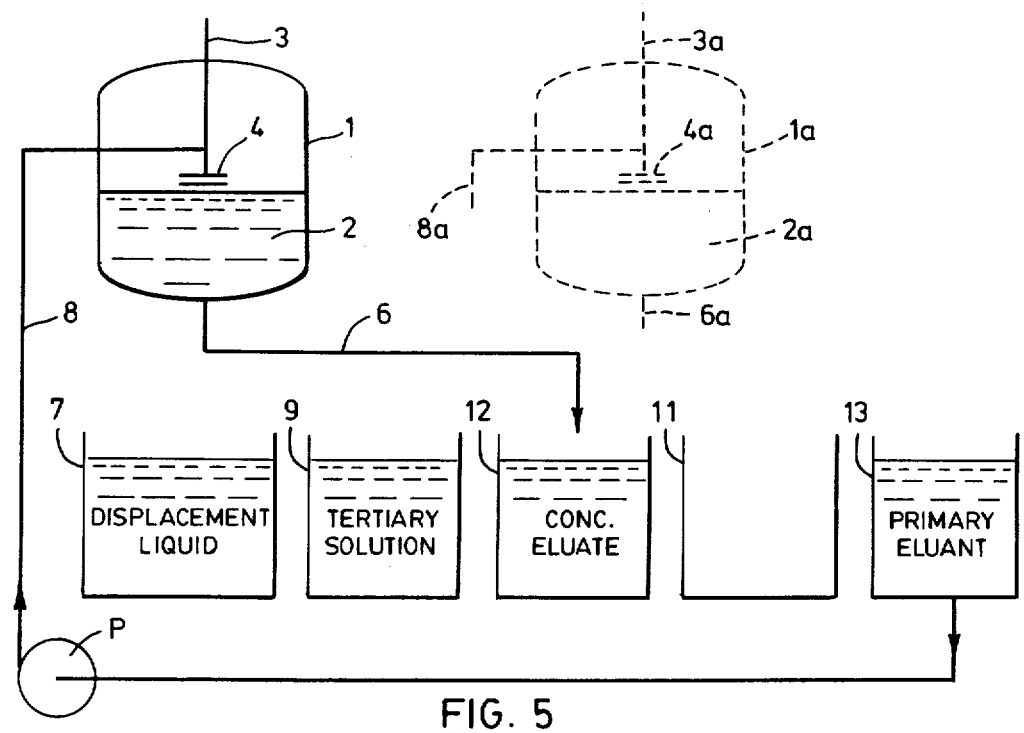

Following termination of stage four, primary eluant, which is preferably an aqueous ammonia solution of 1 to 15% by weight, more preferably about 60% by weight concentration (calculated as $NH_3$) is passed to the resin 2 from a reservoir 13 thereof which is periodically replenished. As shown in FIG. 5, a first fraction of the effluent from the resin is added to the concentrated eluate collected during stage four in the tank 12. During this stage the concentration of copper in the effluent from the bed gradually decreases. It is undesirable to collect too small a volume of effluent during stage five as this will result in inefficient recycling of copper to the secondary eluant tank in stage 6, while if too large a quantity is collected this will lead to undesired dilution of the bulk of the concentrated eluate collected in tank 12. The appropriate volume of liquid to be taken as the first fraction can readily be determined through trial and experiment by one skilled in the art. Typically this will be about 0.1 to 1.0 bed volumes. In the preferred form, this volume is about 0.4 bed volumes.

Figure 6:
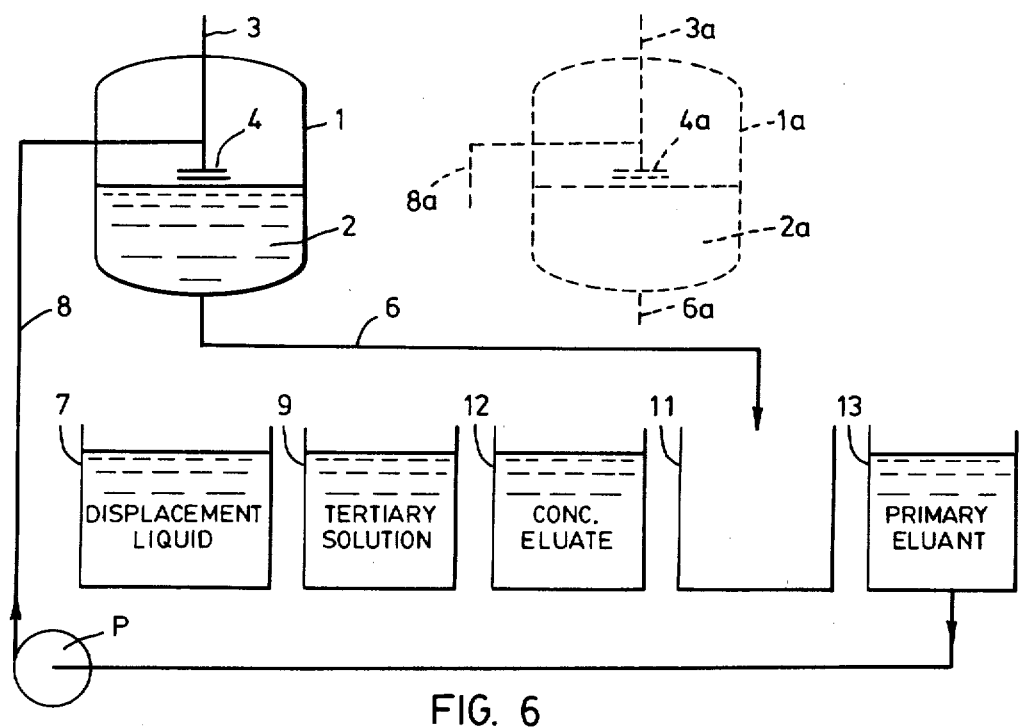

The remaining fraction is collected as secondary eluant in the tank 11 in stage six of the cycle, as shown in FIG. 6. Typically the total volume of primary eluant passed in stages five and six is about 0.5 to about 2.5 bed volumes, more preferably about 1.2 bed volumes, from which about 0.5 to about 1.5 bed volumes are collected as the second fraction as secondary eluant solution in the tank 11.

The product concentrated copper eluate can be withdrawn from tank 12 and, after re-charging the bed 2, the cycle can be recommenced at stage one, commencing with the bed 2 being again freshly loaded with copper ions. In some applications of the process, instead of operating with only a single bed 2 of resin, in order to make the elution process continuous and to avoid interruption of the process while the bed 2 is being recharged with copper, the elution cycle may be operated in conjunction with two or more discrete beds of resin, as for example as indicated in the drawings where a second bed 2a is shown in broken lines. This permits one or more of the beds to be employed as absorbers while the remaining bed is being eluted and, after the completion of the elution cycle, the eluted bed is switched to absorption and a further charged bed is connected to the above-described elution apparatus. The elution can thus proceed sequentially among the various beds 2, 2a, etc.

An Example of a process in accordance with the invention will now be given.

EXAMPLE

A process was conducted in accordance with the detailed description given above. The vessel 1 was constituted by a column 2.5 cm diameter and 122 cm tall. This was charged with 450 ml of DOWEX XFS 4195 chelating anion exchange resin. As it was desired to employ the resin in the sulphate form, the resin was pretreated by passing 2 bed volumes of 6% by weight $NH_3$ aqueous solution followed by 4 bed volumes an aqueous solution containing 25 g/l $H_2SO_4$. The resin was loaded with copper (cupric) ion by recirculating an acidic aqueous pregnant copper solution containing $H_2SO_4$ at 25 g/l to which 50 g of $CuSO_4.5H_2O$ had been added, to load the resin to a content of copper ions of 28 g/l.

The elution cycle was conducted using vessels 7, 9 and 11 to 13 whose capacities were in excess of the required minima indicated in Table 1, as dictated by the volumes of process liquids they must accept or supply in each elution cycle.

TABLE 1

| Tank | Contents | Minimum Capacity |
|---|---|---|
| 7 | Displacement liquid (aqueous $NH_2SO_4$ solution) | 0.3 bed volumes (BV) |
| 9 | Low grade ammoniacal copper sulphate solution | 0.4 BV |
| 12 | Empty (to contain concentrated eluate) | 0.8 BV |
| 11 | Intermediate strength ammoniacal copper sulfate solution | 0.8 BV |
| 13 | Eluant 6% by wt. $NH_3$ aqueous solution | 1.2 BV |

The elution was conducted in five elution cycles. After each cycle, the resin column was re-loaded with copper, product eluate was withdrawn from eluate tank 12, and tanks 7 and 13 were replenished with the aqueous ammonium sulfate and ammonia solutions, respectively.

The passage of liquids through the resin bed in various stages in each cycle were as indicated in Table 2.

TABLE 2

| Stage | Flow | Quantity passed |
|---|---|---|
| 1 | Tank 7 to waste | 0.3 BV |
| 2 | Tank 9 to waste | 0.4 BV |
| 3 | Tank 11 to tank 9 | 0.4 BV |
| 4 | Tank 11 to tank 12 | 0.4 BV |
| 5 | Tank 13 to tank 12 | 0.4 BV |
| 6 | Tank 13 to tank 11 | 0.8 BV |

After five cycles a concentrated eluate product was obtained in tank 12 containing 34.5 g/l Cu.

In comparison the same apparatus was employed under the same conditions for elution employing standard split elution cycles (tank 9 was not employed). The flows of liquids through the bed in each elution cycle were as shown in Table 3.

TABLE 3

| Stage | Flow | Quantity passed |
|---|---|---|
| 1 | Tank 7 to waste | 0.3 BV |
| 2 | Tank 11 to waste | 0.4 BV |
| 3 | Tank 11 to tank 12 | 0.4 BV |
| 4 | Tank 13 to tank 12 | 0.4 BV |
| 5 | Tank 13 to tank 11 | 0.8 BV |

After five cycles of elution the concentrated eluate in tank 12 contained 27.5 g/l Cu.

It will be noted that in Table 2, the flows of effluent leaving the bed in stages 1 and 2 may be recycled to the pregnant copper solution employed for loading the resin between cycles.

I claim:

1. Method for the successive elution of cupric ion-loaded beds of chelating anion exchange resin, to recover an eluate of relatively high copper concentration, said resin being characterised by having pendent aminopyridine groups, comprising subjecting each bed to an elution cycle comprising (a) contacting the bed with a tertiary ammoniacal solution of relatively low copper concentration obtained as effluent solution from step (f) of the preceding elution cycle;

(b) withdrawing a first effluent solution from the bed;

(c) removing said first effluent solution from the system;

(d) contacting the bed with a secondary ammoniacal eluant solution of intermediate copper concentration obtained as effluent from step (k) of the preceding elution cycle;

(e) withdrawing from the bed first and second fractions of a second effluent solution, said fractions having relatively low and relatively high copper concentrations, respectively;

(f) collecting the first fraction of said effluent solution for use as tertiary solution in step (a) of the next elution cycle;

(g) recovering said second fraction;

(h) contacting the bed with a primary ammoniacal eluant solution substantially free of copper ions;

(i) withdrawing from the bed first and second fractions of effluent solution having relatively high and intermediate copper concentrations, respectively;

(j) recovering said first fraction;

(k) collecting said second fraction for use as secondary eluant in step (d) of the next elution cycle;

(l) providing a bed of cupric ion-loaded chelating anion exchange resin; and (m) re-commencing said elution cycle by repeating steps (a) to (l).

2. Method as claimed in claim 1 wherein a plurality of discrete beds of the resin are subjected successively to said elution cycle.

3. Method as claimed in claim 1 comprising providing a single bed of resin and alternately loading said bed by contacting it with a cupric solution and subjecting the loaded bed to said elution cycle.

4. Method as claimed in claim 1 wherein the loaded resin bed initially contains an aqueous cupric solution and including the step of flowing into the bed a quantity of an aqueous barrier solution that is inert with respect to said cupric solution and said tertiary solution used in step (a) before commencing step (a) of the elution cycle, and removing from the system effluent solution that is displaced.

5. Method as claimed in claim 4 wherein from about 0.1 to 0.5 bed volumes of barrier solution are added.

6. Method as claimed in claim 5 wherein about 0.3 bed volumes of barrier solution are added.

7. Method as claimed in claim 4 wherein the barrier solution comprises water or ammonium sulfate.

8. Method as claimed in claim 7 wherein the barrier solution comprises ammonium sulfate.

9. Method as claimed in claim 1 wherein the primary eluant of step (h) comprises aqueous ammonia solution containing from about 1 to 15% by weight of $NH_3$.

10. Method as claimed in claim 9 wherein said eluant contains about 6% by weight of $NH_3$.

11. Method as claimed in claim 1 wherein in step (a) the bed is contacted with from about 0.1 to 1.0 bed volumes of the tertiary solution.

12. Method as claimed in claim 11 wherein the volume of tertiary solution is about 0.4 bed volumes.

13. Method as claimed in claim 1 wherein in step (d) about 0.4 to 1.5 bed volumes of the secondary eluant are added.

14. Method as claimed in claim 13 wherein the volume of secondary eluant is about 0.8 bed volumes.

15. Method as claimed in claim 13 wherein about 0.1 to about 1.0 bed volumes each of the first and second fractions are withdrawn in step (e).

16. Method as claimed in claim 15 wherein said volumes are each about 0.4 bed volumes.

17. Method as claimed in claim 1 wherein about 0.5 to about 2.5 bed volumes of primary eluant are added in step (h).

18. Method as claimed in claim 17 wherein the volume of primary eluant used is about 1.2 bed volumes.

19. Method as claimed in claim 17 wherein about 0.1 to 1.0 bed volumes of said first fraction are withdrawn in step (i).

20. Method as claimed in claim 19 wherein the volume of the first fraction is about 0.4 bed volumes.

21. Method as claimed in claim 17 wherein about 0.5 to about 1.5 bed volumes of the second fraction are collected in step (k).

22. Method as claimed in claim 21 wherein the volume of the second fraction is about 0.8 bed volumes.

23. Method as claimed in claim 1 wherein the resin is characterized by accepting cupric ions from solutions thereof of pH lower than 7.

24. Method as claimed in claim 23 wherein the resin is characterised by having pendent 2-picolylamine groups.

* * * * *